United States Patent
Mills

(10) Patent No.: US 7,350,136 B2
(45) Date of Patent: *Mar. 25, 2008

(54) VOTING SYSTEM FOR IMPROVING THE PERFORMANCE OF SINGLE-USER DECODERS WITHIN AN ITERATIVE MULTI-USER DETECTION SYSTEM

(75) Inventor: Diane G. Mills, Wilmington, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 382 days.

This patent is subject to a terminal disclaimer.

(21) Appl. No.: 10/987,140

(22) Filed: Nov. 12, 2004

(65) Prior Publication Data

US 2005/0097423 A1    May 5, 2005

Related U.S. Application Data

(63) Continuation of application No. 10/055,155, filed on Jan. 23, 2002, now Pat. No. 6,839,390.

(51) Int. Cl.
*G06F 11/08*     (2006.01)
*H04L 27/06*     (2006.01)

(52) U.S. Cl. .................................. 714/797; 375/341

(58) Field of Classification Search ................. 714/797
See application file for complete search history.

(56) References Cited

U.S. PATENT DOCUMENTS

2002/0037737 A1    3/2002    Learned

OTHER PUBLICATIONS

Alexander, Paul D.; Reed, Mark C.; Asenstorfer, John A.; Schlagel, Christian B., "Iterative Multi-User Interference Reduction: Turbo CDMA." *IEEE Transactions On Communications*, vol. 47, No. 7, Jul. 1999.

*Primary Examiner*—Shelly Chase
(74) *Attorney, Agent, or Firm*—Daniel J. Long; Robert K. Tendler

(57) ABSTRACT

A system is presented that provides real-time performance for iterative multi-user detectors, such as Turbo MUDs, which are used to separate simultaneous transmissions on the same frequency, by permitting the MUD to use a less computationally intense, fast-processing algorithm and to correct for errors caused by the fast processing. In order to reduce the errors, a voting system is coupled to the output of the multi-user detector within the iterative system. The voting system provides confidence values on a bit-by-bit basis for the estimates made by the multi-user detector, with the confidence values then being utilized as soft inputs to a bank of conventional single-user decoders.

4 Claims, 2 Drawing Sheets

VOTING SYSTEM FOR IMPROVING THE PERFORMANCE OF SINGLE-USER DECODERS WITHIN AN ITERATIVE MULTI-USER DETECTION SYSTEM

RELATED APPLICATIONS

This is a continuation of U.S. application Ser. No. 10/055,155 filed Jan. 23, 2002 now U.S. Pat. No. 6,839,390, entitled Voting System For Improving the Performance of Single-User Decoders Within an Iterative Multi-user Detection System, the contents of which are incorporated herein by reference.

FIELD OF INVENTION

This invention relates to telecommunications and more particularly to a system for improving the performance of iterative multi-user detection systems.

BACKGROUND OF THE INVENTION

As described in U.S. patent application Ser. No. 09/923,709 by Rachel Learned, filed Aug. 7, 2001 and incorporated herein by reference, a system is described in which multiple users are able to communicate on the same frequency at the same time through the utilization of parameter estimation techniques which are utilized by a multi-user detector. The output of the multi-user detector is the best guess as to what the individual bits were for the individual user.

Moreover, in an article by Paul D. Alexander, Mark C. Reed, John A. Asenstorfer and Christian B. Schlagel in *IEEE Transactions on Communications*, vol. 47, number 7, July 1999, entitled "Iterative Multi-User Interference Reduction: Turbo CDMA," a system is described in which multiple users can transmit coded information on the same frequency at the same time, with the multi-user detection system separating the scrambled result into interference-free voice or data streams.

Multi-user detection units, in general, operate by examining the entire number of possibilities for each bit, which is a computationally complex operation. Thus for those multi-user detectors that examine the entire space, real-time operation is often elusive.

For multi-user detectors of the type of iterative multi-user detection system described in the above article, currently called a Turbo MUD, algorithms examine the space of all possible combinations. A MUD algorithm within the Turbo MUD system determines discrete estimates of the transmitted channel symbols, with the estimates then provided to a bank of single-user decoders (one decoder for each user) to recover the input bit streams of all transmitted signals.

Two general types of multi-user detectors within the Turbo MUD system are possible: those that provide hard outputs, which are discrete values, and those that provide soft outputs, which indicate both the discrete estimate and the probability that the estimate is correct.

However, single-user decoders operating on hard values, or discrete integers, have unacceptable error rates when there is a large amount of interference. The reason is that discrete integers do not provide adequate confidence values on which the single-user decoder can operate. These decoders operate better on so-called soft inputs in which confidence values can range from −1 to 1, such as for instance 0.75 as opposed to being either −1 or +1.

In an attempt to provide so-called soft values which can then be utilized by a single-user decoder, these soft values can be generated by the multi-user detector. However the processing takes an inordinate amount of time. As a result, these systems do not produce real-time results. Since single-user decoders operate best on soft values, it is often times the case that the computational complexity for the MUD to enable it to generate these soft values makes it impossible to get a real-time result.

In an attempt to provide real-time performance by reducing the computational complexity of an iterative multi-user detector which can produce soft values, the above-mentioned paper suggests algorithms for examining less than the total number of possibilities for each of the bits of data that are coming in from the multiple users. The "shortcuts" taken by this reduced complexity approach cause errors; and combating these errors by increasing the parameters used withing the MUD algorithm and by increasing the number of iterations of the system completely nullifies any advantage.

Thus, while soft values can be generated in the above manner, the entire detection system is slowed down in generating these soft values.

It will be appreciated that these soft values, rather than being integers which would be considered to be hard values, are real numbers, which in effect, permit a single user decoder to better error correct the output of the multi-user detector and thereby provide a more robust bit stream that will faithfully track the original input for a given user.

In one embodiment, the single user detector is a so-called BCJR Decoder, which stands for a Bahl, Cocke, Jelinek, and Raviv Decoder. A characteristic of such a decoder is that it utilizes maximum a posteriori or MAP algorithms to error-correct the incoming signals. It will be appreciated that MAP error correction depends upon soft values in order to be able to increase the probability that the decoded bits will faithfully reflect the input.

The result of utilizing BCJR decoders along with Turbo MUDs is that as many as 100 users can transmit on a single frequency at the same time, with the intelligence carried by each of the users separated and decoded in such a manner that the probability that the decoded bit stream is correct is quite high.

As stated above, the problem with Turbo MUDs is that while the individual communications channels can be separated and thereby rendered usable, real-time processing has been elusive due to the MAP and maximum likelihood correction algorithms normally utilized in a Turbo MUD.

Moreover, when dealing with hand-held communications units such as wireless handsets, the amount of processing within the device is limited, as is the amount of computational complexity that is allowed. In order to provide real-time performance both at a cell site and the handset, it therefore becomes important to be able to reduce the amount of computational complexity and processing time so as to achieve real-time performance.

SUMMARY OF THE INVENTION

Rather than requiring the multi-user detector to provide so-called soft outputs and thereby increase the computational complexity and processing time, in the subject invention, hard outputs from the multi-user detector are tolerated by converting these hard outputs into soft outputs through a voting algorithm that analyzes, for each user, the various guesses from the multi-user detector as to what the particular bit is, either +1 or −1 in one embodiment. It will be noted that the output of the multi-user detector is a series of best guesses as to what the particular decoded bit should be. These guesses are the result of the application of various assumptions in the multi-user detection algorithm based upon what pre-knowledge of the signals ought to be.

The voting algorithm for each user averages the results of a predetermined number of best guesses and provides that average as a real number.

For instance, assume User 1 has the following guesses as to the particular bit: +1, +1, −1, +1. Then the average is 0.75 and represents the confidence factor for the particular bit being a +1. It will be appreciated that the integers which are averaged are the hard outputs of the multi-user detector. This obviates doing a soft output calculation in the MUD itself, which takes an inordinate amount of time.

It will be appreciated that in convolutional decoders, it is the job of the decoder to establish that a given bit sequence is likely to predict the next bit level. Thus, for instance, if it is expected that the bit sequence should be +1, +1, +1, −1, +1, then probability of the next bit being a +1 is very high and the decoder therefore outputs for that particular bit a +1 with a certain degree of confidence, even if the detected bit was a −1, thereby correcting a detection error cause by channel interference.

The problem with hard-input/hard-output convolutional decoders is that there is no weight given to gray areas between +1 and −1 as to the probability that the particular bit is correct. A soft value of a +1 times a particular confidence value is more useful in the convolutional decoder coming to the correct result than the prior method.

With the soft value output of the voting algorithm being applied to the single-user decoder, the convolutional decoder can take into account real numbers as opposed to integers in deciding what a given bit should be.

What will be appreciated is that a soft input can be applied to a single-user detector in a non-computationally intense way. What this means is that soft values can be applied to this decoder without having to generate a soft output from a multi-user detector. The result of not having to generate a soft output for multi-user detectors means that close to real time decoding is possible, since the voting algorithm is a simple averaging process requiring little computational overhead.

It will be appreciated that the improved performance of the single user decoder can also be utilized to improve the performance of the multi-user detector. The output of the single-user detector, having been improved through the utilization of the aforementioned voting algorithm, can be utilized in a feedback loop to the multi-user detector to improve its selection process utilized.

Note that a multi-user detector system for a coded signal, such as a Turbo MUD, analyzes the incoming bit streams with respect to both the relationship among users during one bit interval, and the relationship of bits within a bit sequence for one user. Since the output of the single-user decoder is correcting the bit sequences for each user, the correct bit sequences when known by the multi-user detector results in more accurate detection of the incoming bit streams for other users during each individual bit interval. Moreover, given more accurate detections by the multiuser detector, each single user decoder examines and corrects the estimated data sequence for one user, and are more effective in their error correction as a result of the more accurate input.

For instance, assume that for a given bit interval, the confidence value for a particular user is, for instance, 0.5 for that particular bit. By feeding back this confidence value to the multi-user detector, for the next time interval the confidence value from the voting algorithm may indicate a 0.6. Taking this confidence value and passing it through the single-user decoder, and using it again in the multi-user detector, on the third iteration the confidence value may approach 0.9.

The result of the iterative processing is that the performance of the single-user decoder is markedly improved. As a result, the final output data streams, which are the main concern of the intended listeners, are more accurate.

To quantify the type of improvement utilizing the voting algorithm as opposed to not using it, for a soft output from a MUD, the computational complexity is between 2 and 4 orders of magnitude less. The difference in processing time is between using a hard output MUD with the voting system and a soft output MUD. The result is that the processing time is cut by as much as three times and is often times cut in half when utilizing the subject system.

In summary, the described system provides real-time performance for iterative multi-user detectors, such as Turbo MUDs, which are used to separate simultaneous transmissions on the same frequency, by permitting the MUD to use a less computationally intense, fast-processing algorithm and to correct for errors caused by the fast processing. In order to reduce the errors, a voting system is coupled to the output of the multi-user detector within the iterative system. The voting system provides confidence values on a bit-by-bit basis for the estimates made by the multi-user detector, with the confidence values then being utilized as soft inputs to a bank of conventional single-user decoders. The use of soft inputs improves the performance of each of the decoders when compared to the performance that would be the result if the decoders were driven directly with the output of a hard-output MUD within a Turbo-MUD system. Each single-user decoder is a soft-input decoder which operates on real number inputs as opposed to discrete integers so that the output of the decoder is much less error prone. The output of the decoder is also utilized to improve the multi-user detection process by coupling confidence values from the single-user decoder to the multi-user detector to allow it to recompute its estimates of the incoming signal. Compared to non-iterative systems operating on coded transmissions the result of using the iterative Turbo MUD with a voting system is the ability to accommodate two to five times the number of users. Alternatively, for real-time processing with the same number of users, the multi-user detector and decoder algorithms can be less complex, thereby permitting real-time decoding. In this embodiment, the output of the less complex multi-user detector is provided with simple error correction using the voting system that minimizes the effects of the less complex processing without significantly increasing processing times. In summary, rapid but error-prone multi-user detector algorithms may be used for real-time performance, with error correction provided by using the subject voting system.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
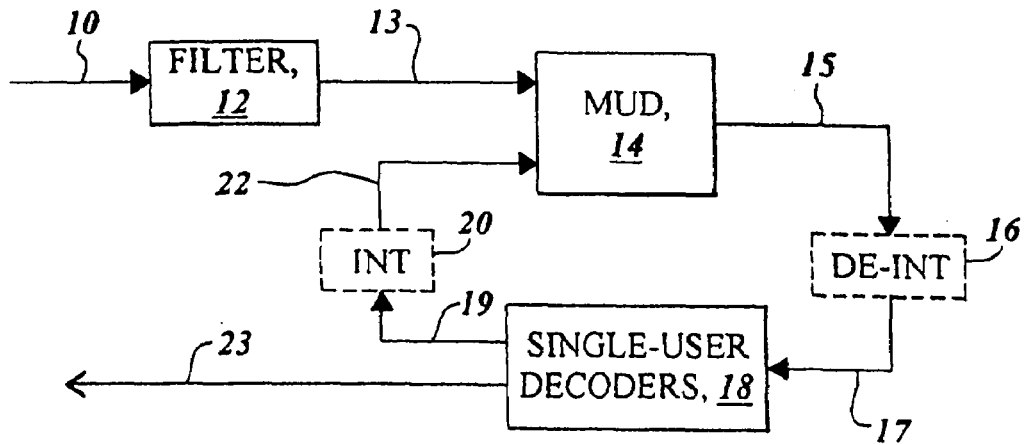
FIG. 1 is a block diagram of a prior art iterative system illustrating the utilization of a multi-user detector coupled to a bank of single-user decoders in which the multi-user detector provides soft outputs to the single-user decoders; and, FIG. 2 is a block diagram of the subject system in which the multi-user detector has a hard output coupled to a voting algorithm which provides a soft output that is applied to the single-user decoder; and, FIG. 3 is an illustrative example showing the operation done within the voting box used to convert the hard outputs of the MUD to soft-valued inputs to the decoders.

It will be noted that there are two embodiments of the subject invention: an iterative embodiment and a non-iterative embodiment. The iterative embodiment will be fully described. The changes necessary for the non-iterative embodiment will be presented relative to the iterative embodiment. FIG. 1 shows an iterative MUD algorithm presented by Alexander et al in as a representative of the approaches used to incorporate iterative decoding methods in joint MUD/FEC decoding and as a representative of the approaches used to then reduce the complexity of the iterative system. This detector assumes knowledge of various parameters such as relative received timing offsets, carrier phase, frequency offsets, received amplitudes, and multipath structure for each of the interfering signals present in the received signal. A parameter estimation unit is therefore implied, but is not shown in FIG. 1. In a Turbo MUD system, such as is shown in FIG. 1, decoding and confidence information is passed between the MUD and single-user, SU, decoder components. Maximum a posteriori, MAP, decoders are used for both the MUD and SU decoders so that soft output information is available if desired. MAP decoding is described in C. Schlegel, *Trellis Coding*, IEEE Press, 1997; Robertson, Villebrun and Hoeher, "A Comparison of Optimal and Sub-Optimal MAP Decoding Algorithms Operation in the Log Domain," *ICC*95; Hagenauer, and Hoeher, "A Viterbi Algorithm with Soft-Decision Outputs and its Applications," *Globecom* 89; Pottie and Taylor, "A Comparison of Reduced complexity Decoding Algorithms for Trellis Codes," *J Sel. Areas in Comm* December 1989, among other other literature. The iterative turbo principle, on which Turbo MUD is based, is described in open literature represented by Berrou, Glavieux, and Thitimajshima, "Near Shannon Limit Error-Correcting Coding and Decoding: Turbo-Codes (1)," *ICC* 93; Berrou and Glavieux, "Near Optimum Error Correcting Coding and Decoding: Turbo-Codes", *Trans on Comm*, October 1996; and Wang and Kobayashi, "Low-Complexity MAP Decoding for Turbo Codes", *Vehicular Technology Conference* 2000]. Turbo MUD approaches are described in, for example, Alexander, Reed, Asenstorfer, and Schlegel, "Iterative Multiuser Interference Reduction: Turbo CDMA," *Trans on Comm*, July 1999; and other open literature: Poor, "Turbo Multiuser Detection: An Overview," *ISSSTA* 2000; and Wang and Poor, "Iterative (Turbo) Soft Interference Cancellation and Decoding for Coded CDMA", *Trans on Comm*, July 1999.

More particularly, in FIG. 1, the received measurement vector on line 10 is passed through a whitening matched filter 12. The filtered signal on line 13 is then passed into a MUD detector 14. In the optimum case, the MUD detector is a full-complexity MAP detector. Suboptimal reduced complexity MAP approaches for MUD detector 14 may be used in an effort to achieve real-time performance as distributed by Wang and Poor.

MUD detector 14 passes soft decisions in the form of reliability, or confidence measures to the single user decoders. The reliability measures are on line 15, and the bank of single-user decoders is represented at 18. When necessary, the measures on line 15 are first passed through a de-interleaver 16 and passed on in shuffled form on line 17 to decoders 18. Single-user decoders 18 calculate conditional probabilities and output them as confidence values on line 19.

Interleaving is performed at 20 if interleaving is present in the transmitter. The shuffled conditional probabilities are placed on line 22 and are then used by the MUD algorithm in MUD 14. Interleaving in interleaver 20 and de-interleaving in de-interleaver 16 are done when interleaving is present in the transmitter. De-interleaver 16 and interleaver 20 are not always necessary and are thus shown by dotted boxes. The passing of information between the MUD and the single-user decoders repeats in subsequent iterations until an asymptote is reached or the desired performance level is attained. At that point, estimates of the data sequences for all active users are output on line 23. Operation then commences for the next block of data, repeating the process described above.

Figure 2:
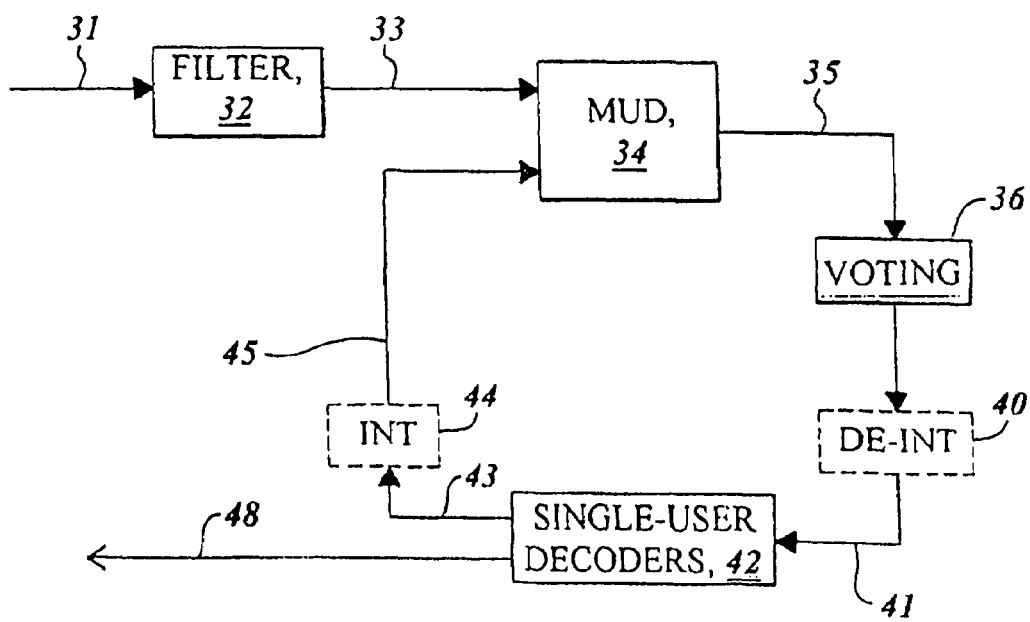

FIG. 2 is a diagram describing the subject invention in which a voting procedure is used along with a reduced-complexity tree- or trellis-search ML or MAP approach. Voting system 36 examines the bit estimates in the surviving sequences or "best guesses" determined by MUD 14 and produces a soft reliability value. The addition allows the system to provide soft reliability values for each user's symbol sequence, i.e. bits, at a low complexity cost. As an additional feature of the subject invention, in overloaded environments, the system includes a whitening matched filter capable of operating on received signals containing more users than dimensions, so that the overall apparatus is compatible with overloaded systems.

As was the case for the Turbo MUD described in FIG. 1, parameter estimation is also implied, and is as described in the aforementioned patent application by Rachel Learned.

The apparatus shown in FIG. 2 is now described in more detail. The received measurement on line 31 representing the received signal is passed through a whitening filter 32. Whitening filter 32 can either be a filter designed to pre-process a signal comprised of more transmissions than orthogonal channels that is needed for overloaded systems, or a lower complexity whitening filter can be used in under-loaded systems. The filtered signal on line 33 is then passed into a MUD detector 34. MUD detector 34 can contain any reduced complexity tree-searching or tree-pruning soft-input multi-user detector such as a the full-complexity MAP, reduced complexity M-algorithm MAP approximation, for example the algorithm presented by Alexander, Reed, Asenstorfer, and Schlegel, "Iterative Multiuser Interference Reduction: Turbo CDMA," *Trans on Comm*, July 1999. Other possibilities include the algorithms described by Poor, "Turbo Multiuser Detection: An Overview," *ISSSTA* 2000; Wang and Poor, "Iterative (Turbo) Soft Interference Cancellation and Decoding for Coded CDMA", *Trans on Comm*, July 1999; Das, Erkip, and Aazhang, "Computationally Efficient Iterative Multiuser Detection and Decoding", *Asilomar* 1998; Herzog, Schmidbauer, and Hagenauer, "Iterative Decoding and Despreading improves CDMA-Systems using M-ary Orthogonal Modulation and FEC," *ICC*'97; or any other algorithm that calculates the cost of multiple paths through a decision tree or trellis. MUD detector 34 passes the surviving symbol combination possibilities in terms of M survivors for the M algorithm, for instance, or several most likely, for other approaches, on line 35 to voting system 36.

The voting procedure for voting system 36 is now described. The procedure may be applied to synchronous or asynchronous systems, but for simplicity, only the synchronous case is described in detail here, with the extension to asynchronous being obvious. For each symbol interval, MUD 34 determines the likelihood of some number of symbol combinations from the users, one from each user. For example, the MAP and ML MUD determine the likelihood of $2^{(\# \text{ of users})}$ combinations. The M-algorithm-based approaches then calculate the likelihood of M combinations. The combinations estimates for which likelihoods are calculated are called survivors, which represent the best guesses as to what a bit is for a given user. Thus, for the symbol interval, each survivor contains a bit estimate and likelihood for every symbol possibility, +1/−1 for BPSK, for instance, for every user. The voting procedure is then done for each symbol interval, i.e. each bit. For each user, the estimate from every survivor for that user is examined and included in a vote. After all survivors are examined for the given user, the vote tally is divided by the total number of survivors, to provide a normalized, soft estimate of the symbol or bit for the user. The process is done for each user.

Figure 3:
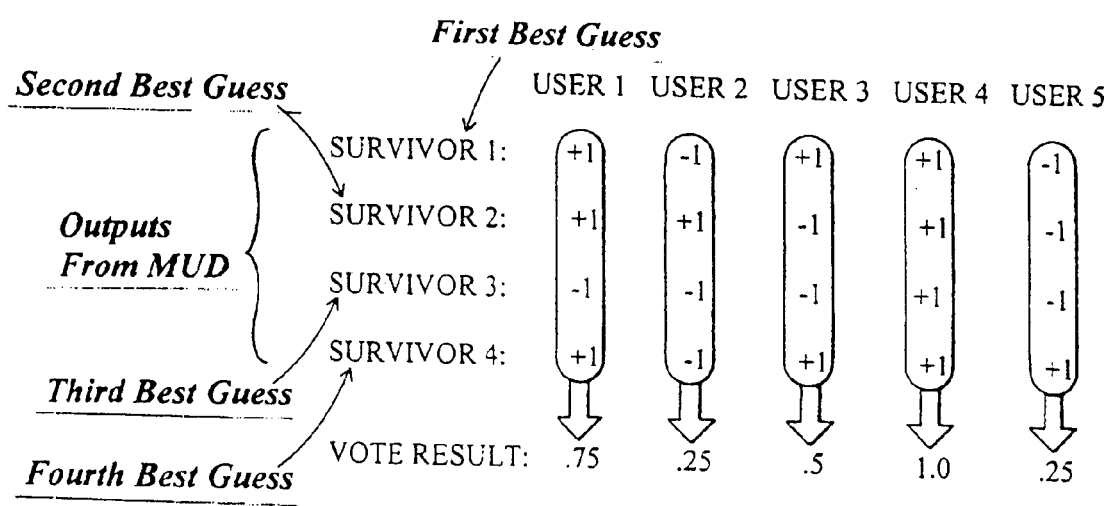

It will be appreciated that what is shown in FIG. 3 is a snapshot for one bit interval for all of the users indicated. Within the MUD detector of the Turbo MUD system, a tree search algorithm is invoked. The tree search algorithm might be the M algorithm, the T algorithm or any other type of tree search or trellis search algorithm which calculates a number of different survivors and ranks them according to their likelihood. In short, the survivors are ranked as to the best guess as to what a given bit is, followed by the next best guess, etc.

It will thus be appreciated that as a result of the processing by the Turbo MUD, there are a number of survivors, here labeled Survivor 1, Survivor 2, Survivor 3 and Survivor 4. These survivors correspond to the best guesses for a given incoming bit after having been processed by the Turbo MUD through one of a number of its internal algorithms.

As can be seen, the best guesses as to what the character should be for User 1 in Column 1 are: +1, +1, −1, +1. A simple averaging of these values gives a vote result of 0.75. It is this real number which is used by the follow on single-user decoder.

Thus in the illustrated example, there are 4 survivors and 5 users and BPSK symbols are assumed. One symbol interval is shown. It will also be assumed in the example that soft values will range from 0 to 1, with 1 corresponding to a "certain" +1 and 0 corresponding to a "certain" −1. It can be seen that the voting is done for each user, by examining the estimates for the users provided by the survivors that were determined in the MUD detector.

Returning back to FIG. 2, voting system 36 outputs on line 39 the results of the votes for all users and all symbol intervals. The sequences on line 39 provides a reliability measure or soft estimate of the symbols that is possibly deinterleaved in time at 40, if necessary, and then passed in time-shuffled form on line 41 to a bank of single-user decoders 42. Single user decoders 42 use the information as a priori information and output conditional probabilities on line 43 that are then fed back to the MUD algorithm in MUD 34. Again, if interleaving is needed due to the presence of interleavers in the transmitters, the conditional probabilities, one for each channel symbol for each user, on line 43 are first passed through an interleaver 44 and passed on in shuffled form to MUD 34 from line 45.

As mentioned previously, there are two embodiments of this invention: the iterative and non-iterative. In the iterative embodiment, the passing of information between the MUD and the SU decoders repeats in subsequent iterations until an asymptote is reached or the desired performance level is attained or a pre-determined number of iterations have been performed. Then estimates of the data sequences for all active users are output from single-user decoder 42 on line 48. Further explaining the difference between line 48 and line 43, line 48 contains the decoded data bits, while line 43 contains conditional probabilities for the coded channel symbols.

Operation then commences for the next block of data, repeating the process described above. For the non-iterative embodiment, no subsequent iterations are performed. Rather, the estimates of the data sequences for all users are output from decoder 42 on line 48 immediately. This is akin to an iterative approach with only one pass through the system.

While the operation of the subject system has been described in terms of a wireless communications network, it has application to any situation in which digitally encoded interfering signals exist. Thus, the subject system has application to cable networks in which multiple users are seeking to communicate with a head end system simultaneously.

Moreover, the subject system may be utilized in computer hard drives for separating out signals from adjacent tracks when the read head overlies portions of adjacent tracks, as can be the case when thinner tracks are laid down to increase data density.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a system to separate incoming interfering signals, apparatus for improving the performance of a multi-user detector coupled to the incoming signal in which said multi-user detector provides as an output an ordered number of best guesses as to what a particular incoming bit is, comprising:
   a voting unit connected to said multi-user detector for averaging for one user the best guesses for said incoming bit, thus to provide a soft output for improving the performance of the multi-user detector.

2. A method for reducing the computational complexity of a multi-user detection system in which an incoming data stream having a number of bits from different users is applied to a multi-user detector, comprising the steps of:
   providing the multi-user detector with a fast algorithm which examines less than the total number of possibilities for each of the bits of data in the incoming data stream, the algorithm resulting in prioritized best guesses as to what an incoming bit is; and,
   for a given bit, averaging a predetermined number of best guesses for a predetermined user to provide a number corresponding to the average of the best guesses, whereby real-time performance can be achieved through the use of said fast algorithm.

3. In a multi-user detection system, a method for increasing the number of users accommodated by a multi-user detector in which a number of best guesses of what a particular bit is for a given user is established as the output of the multi-user detector, comprising the step of:
   averaging the best guesses for a given user for a given bit so as to form a soft input to the single-user detector, whereby less computationally complex algorithms may be used in the multi-user detector to increase the number of users that can be accommodated in a given time interval.

4. The method of claim 3, wherein the multi-user detector utilizes algorithms which for each bit of incoming data analyzes less than the total number of possibilities so as to decrease processing time, such that the increased number of users is accommodated in real time.

* * * * *